(12) United States Patent
Anderson

(10) Patent No.: US 6,189,106 B1
(45) Date of Patent: Feb. 13, 2001

(54) METHOD AND APPARATUS FOR OPERATING AN ELECTRONIC DEVICE AT AN OPTIMAL POWER MODE BASED UPON A SCHEDULED EVENT

(75) Inventor: Glen J. Anderson, Sioux City, IA (US)

(73) Assignee: Gateway, Inc., N. Sioux City, SD (US)

(*) Notice: Under 35 U.S.C. 154(b), the term of this patent shall be extended for 0 days.

(21) Appl. No.: 09/074,913

(22) Filed: May 8, 1998

(51) Int. Cl.[7] .................................. G06F 1/30; G06F 1/32
(52) U.S. Cl. ........................ 713/300; 713/320; 709/102
(58) Field of Search ..................................... 709/100, 102; 713/300, 310, 323, 324, 340; 710/100; 340/825

(56) References Cited

U.S. PATENT DOCUMENTS

| | | |
|---|---|---|
| 5,339,445 | 8/1994 | Gasztonyi ............................. 395/750 |
| 5,412,809 | 5/1995 | Tam et al. ............................ 395/750 |
| 5,452,277 | 9/1995 | Bajorek et al. ........................ 369/54 |
| 5,521,896 | 5/1996 | Bajorek et al. ........................ 369/54 |
| 5,522,081 | 5/1996 | Carls .................................... 395/750 |
| 5,530,918 * | 6/1996 | Jasinski . |
| 5,542,035 * | 7/1996 | Kikinis et al. . |
| 5,544,138 | 8/1996 | Bajorek et al. ........................ 369/54 |
| 5,546,590 | 8/1996 | Pierce .................................... 395/750 |
| 5,623,677 * | 4/1997 | Townsley et al. . |
| 5,640,574 | 6/1997 | Kawashima .......................... 395/750 |
| 5,648,799 | 7/1997 | Kikinis ................................. 345/212 |
| 5,832,283 * | 11/1998 | Chou et al. . |
| 5,902,352 * | 5/1999 | Chou et al. . |
| 5,991,806 * | 11/1999 | McHann, Jr. . |

* cited by examiner

Primary Examiner—Gopal C. Ray
(74) Attorney, Agent, or Firm—Suiter & Associates PC; Kenneth J. Cool

(57) ABSTRACT

A method for scheduling an operational setting of a computer-based information handling system or electronic device is described. An event is scheduled to occur at a predetermined time, and a determination is made from the scheduled event an optimal operational setting at which to set the computer-based information handling system or electronic device during the scheduled event. At the predetermined time, the computer-based information handling system or electronic device is operated at the optimal setting. A method and system for scheduling the power mode operation of a computer-based information handling system wherein the computer based-information handling system is capable of operating at a first power level for maximizing performance while receiving power from an external power source, and is capable of operating at a second power level for minimizing power consumption while receiving power from a battery is further described. An event to occur at a predetermined time is scheduled, and a determination is made whether the scheduled event requires the computer-based information handling system to receive power from the battery. If battery power is required, the second power level is associated with the predetermined event time. At the predetermined event time, the computer-based information handling system is operated at the second power level. A scheduler schedules an event to occur at a predetermined time. A monitor determines whether the scheduled battery power. A power mode selector selects operation of the computer-based information handling system at either the first or the second power level based upon the determination of the monitor.

24 Claims, 4 Drawing Sheets

METHOD AND APPARATUS FOR OPERATING AN ELECTRONIC DEVICE AT AN OPTIMAL POWER MODE BASED UPON A SCHEDULED EVENT

FIELD OF THE INVENTION

The present invention generally relates to the field of computer-based information handling systems, and particularly to operational settings of electronic systems.

BACKGROUND OF THE INVENTION

Many users of portable computer-based information handling systems normally have their power levels set for maximum performance. Operating a computer system at maximum performance requires more power than operating the computer system at a lower performance level. Ordinarily, users set the power consumption levels for maximum performance when the computer system is operated from an external power supply wherein power is received from an ac power outlet. Typically, the computer system is capable of operating at a lower power, lower performance setting during portable operation wherein power is received from an internal battery. When the computer system is set to operate at a lower power level, overall performance is sacrificed in return for maximizing battery life. However, most users forget to change the power settings of their portable computer when operating from battery power, thereby prematurely and unnecessarily depleting the battery and defeating the power management capabilities of the computer system. This situation may occur, for example, during travel wherein it is known ahead of time that battery usage is required during a scheduled airline flight.

Known power management systems for portable battery powered computer systems typically reduce battery power consumption by compiling a history of previous power consumption characteristics of the computer system and then attempting to tailor power control based upon the compiled power consumption history. All the known power management systems only look to the past in an attempt to predict present power consumption requirements. However, there does not exist a power management system for portable battery powered computer systems that selects the power level operation based upon known future power consumption requirements. Further, there lies a need for an electronic device capable of operating at an optimal setting or mode based upon a scheduled event.

SUMMARY OF THE INVENTION

The present invention is directed to a method for scheduling an operational setting of a computer-based information handling system or electronic device. In one embodiment, the method includes the steps of scheduling an event to occur at a predetermined time, determining from the scheduled event an optimal operational setting at which to set the computer-based information handling system during the scheduled event, and at the predetermined time, operating the computer-based information handling system at the optimal setting.

The present invention is further directed to a method for scheduling the power mode operation of a computer-based information handling system wherein the computer based-information handling system is capable of operating at a first power level for maximizing performance while receiving power from an external power source, and is capable of operating at a second power level for minimizing power consumption while receiving power from a battery. In one embodiment, the method includes the steps of scheduling an event to occur at a predetermined time, determining whether the scheduled event requires the computer-based information handling system to receive power from the battery, if the event is determined to require the computer-based information handling system to receive power from the battery, associating the second power level with the predetermined time, and at the predetermined time, operating the computer-based information handling system at the second power level. The method may be tangibly embodied on a medium readable by a computer-based information handling system capable of causing the computer-based information handling system to execute the method.

The present invention is also directed to a system for scheduling the power mode operation of a computer-based information handling system wherein the computer-based information handling system is capable of operating at a first power level for maximizing performance while receiving power from an external power source, and is capable of operating at a second power level for minimizing power consumption while receiving power from a battery. In one embodiment, the system includes a scheduler for scheduling an event to occur at a predetermined time, a monitor for determining whether an event scheduled by the scheduler requires the computer-based information handling system to receive power from the battery, and a power mode selector for selecting operation of the computer-based information handling system at one of the first or the second power levels based upon the determination of the monitor.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
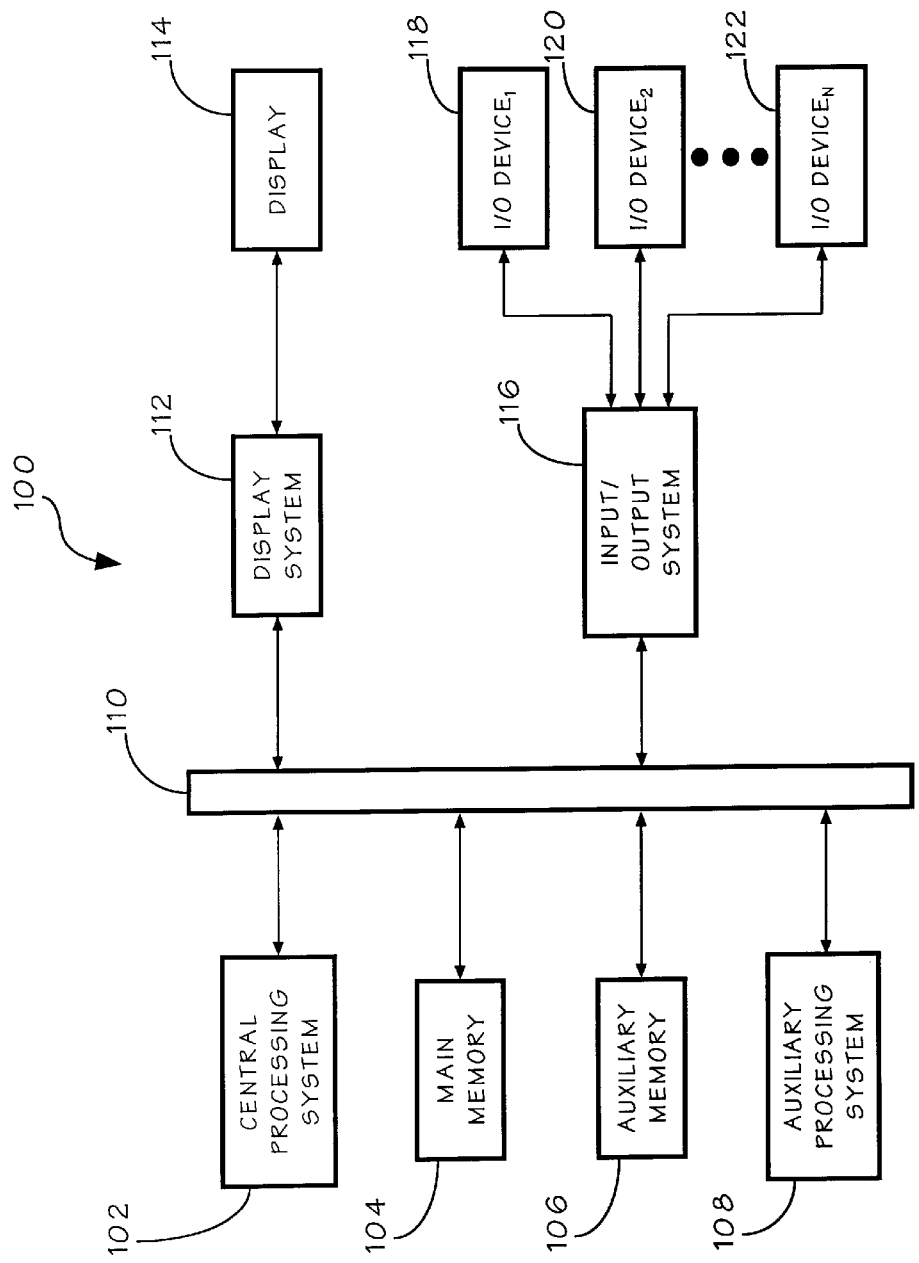
FIG. 1 is a block diagram of a computer-based information handling system operable to embody the present invention.

Referring now to FIG. 1, a hardware system in accordance with the present invention is shown. The hardware system shown in FIG. 1 is generally representative of the hardware architecture of a computer-based information handling system of the present invention. A central processing system 102 controls the hardware system 100. Central processing system 102 includes a central processing unit such as a microprocessor or microcontroller for executing programs, performing data manipulations and controlling the tasks of the hardware system 100. Communication with central processor 102 is implemented through a system bus 110 for transferring information among the components of hardware system 100. Bus 110 may include a data channel for facilitating information transfer between storage and other peripheral components of the hardware system. Bus 110 further provides the set of signals required for communication with central processing system 102 including a data bus, address bus, and control bus. Bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of hardware system 100 include main memory 104, auxiliary memory 106, and an auxiliary processing system 108 as required. Main memory 104 provides storage of instructions and data for programs executing on the central processing system 102. Main memory 104 is typically semiconductor based memory such as dynamic random access memory (DRAM) and or static random access memory (SRAM). Auxiliary memory 106 provides storage of instructions and data that are loaded into main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). The auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Hardware system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Hardware system 100 further includes a display system 112 for connecting to a display device 114, and an input/output (I/O) system 116 for connecting to one or more 10 devices 118, 120 up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between the one or more I/O devices 118–122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118–122 may provide or receive analog or digital signals for communication between hardware system 100 of the present invention and external devices, networks, or information sources. Input/output system 116 and I/O devices 118–122 preferably implement industry promulgated architecture standards, including Ethernet IEEE 802 standards (e.g., IEEE 802.3 for broadband and baseband networks, IEEE 802.3 z for Gigabit Ethernet, IEEE 802.4 for token passing bus networks, IEEE 802.5 for token ring networks, IEEE 802.6 for metropolitan area networks, IEEE 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of hardware system 100 of FIG. I by one having ordinary skill in the art would not depart from the scope or the spirit of the present invention.

Figure 2:
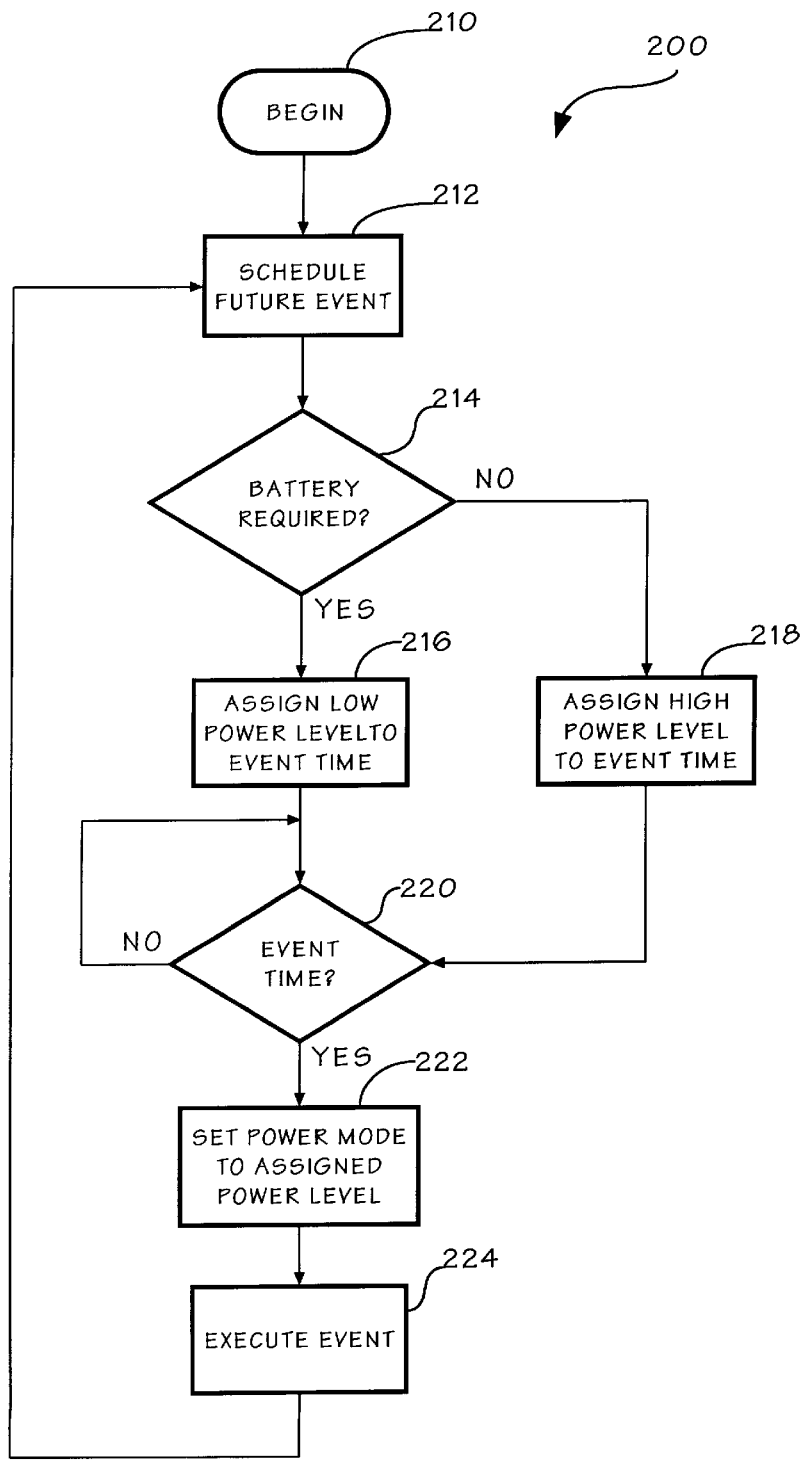
FIG. 2 is a flow diagram of a power management scheduling method in accordance with the present invention.

Referring now to FIG. 2, a flow diagram of a power management scheduling method of the present invention is shown. Upon initiation of method 200 at step 210, a future event is scheduled to occur at step 212. The future event may be any known or predetermined operation, function, or use of computer-based information handling system 100 of FIG. 1, or any known or predetermined operation, function or action of a user of computer-based information handling system, to occur at a predetermined time. For example, a three hour airplane flight may be scheduled on the third day of March at 10:00 a.m. during which computer-based information handling system 100 may be used, for example to prepare a report. Upon scheduling of the event, a determination is made at step 214 whether the event requires computer-based information handling system 100 to receive power from a battery internal to the computer system. Typically, on an airplane flight, no external power source is provided to passengers. Therefore, if a passenger desires to utilize an electronic device such as computer-based information handling system 100, battery operation is required. Under such circumstances, a lower power consumption mode is assigned to or associated with the event time at step 216. The basic input/output system (BIOS), complementary metal-oxide silicon random access memory (CMOS RAM) or operating system of computer-based information handling system 100 manage the monitoring of time and power level mode of computer-based information handling system 100. Typically, the BIOS firmware services (routines) are stored in auxiliary memory 106 in a ROM chip such as a flash ROM. If computer-based information handling system 100 is determined not to require battery power (i.e. power may be received from an external power source), a higher power level mode is assigned to the event time at step 218.

The BIOS services continually monitor the present time in conjunction with the CMOS RAM device of computer-based information handling system 100 and determine whether the present time is equal to the scheduled event time at step 220. The CMOS RAM device may also exist as auxiliary memory 106, typically on a complementary metal-oxide silicon (CMOS) semiconductor device whose contents are maintained by a battery. CMOS RAM maintains the date, time, and system parameter settings of computer-based information handling system 100. The BIOS service routines may include the real-time clock (RTC) service routines and the user timer service routines typically included with BIOS services. Upon reaching the scheduled event time, the BIOS sets the power mode of computer-based information handling system to the mode assigned to the scheduled event at step 222. Computer-based information handling system 100 executes the scheduled event at assigned power level at step 224.

Power level settings may affect one or more hardware or software components of computer based information handling system as controlled by method 200. For example, processor speed, clock speed, LCD backlight level, hard disk drive suspend time, and system suspend times may be adjusted in accordance with the assigned power level. Further, method 200 contemplates multiple power level settings and selectively setting the devices in an optimal combination according to whether a particular device or function is or is not required or is or is not desired. For example, in a first low power mode, no LCD backlighting is utilized and the processor operates at a maximum power level. At a second power level, LCD backlighting is utilized continuously and the processor operates at a lower speed, lower power level. In a third power level, LCD backlighting is utilized with a timer that suspends the backlighting after a predetermined period during which no inputs are received, and the processor operates at a lower speed, lower power. Selected operational combinations may be selected according to the scheduled event or according to the required or desired utilization of computer-based information handling system 100 during the scheduled event. For example, for an event scheduled to occur in a low ambient light level environment and battery power is required, a lower power level of operation may be selected.

Figure 3:
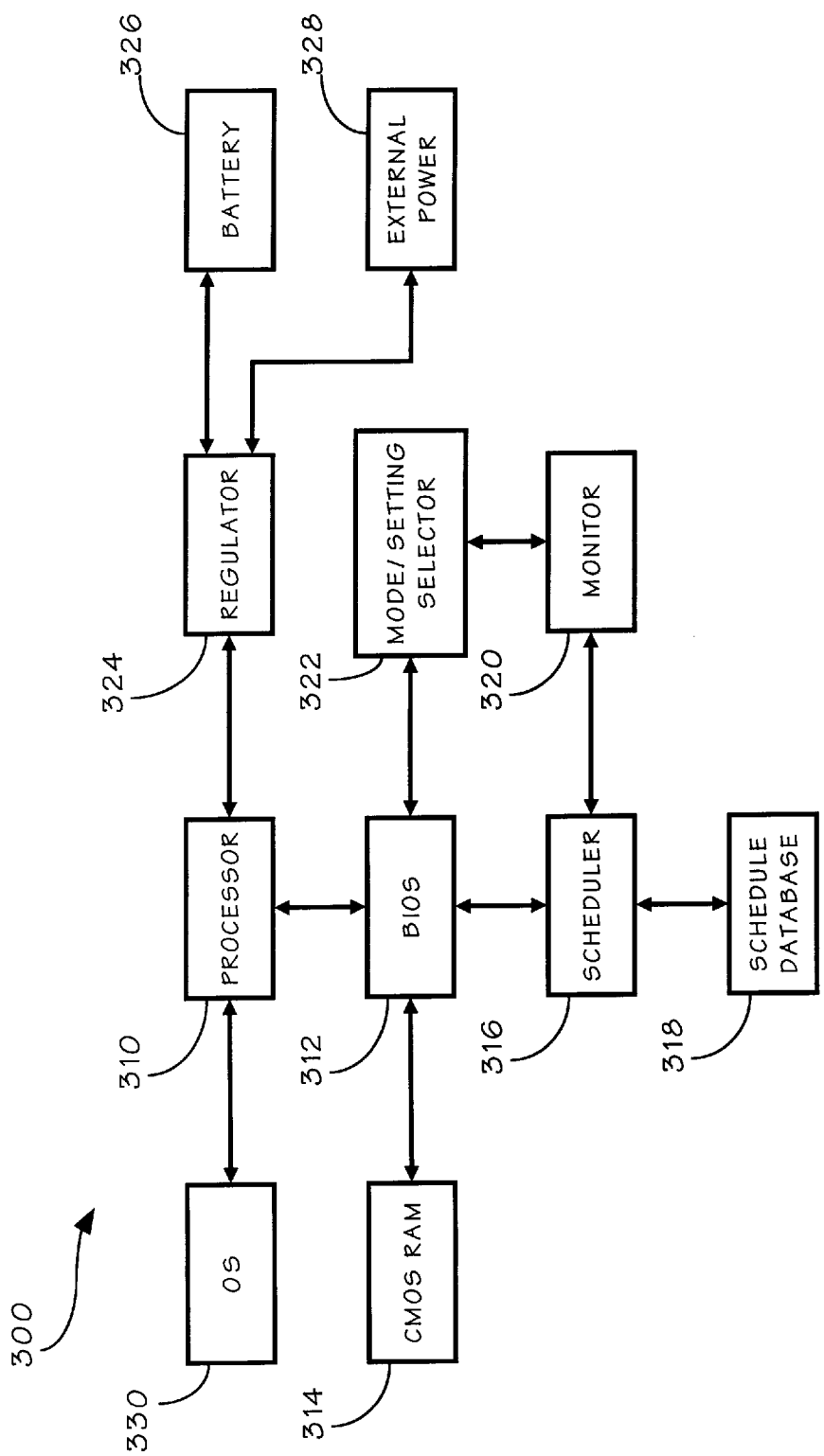
FIG. 3 is a block diagram of a system for scheduling the power mode operation of a computer-based information handling system in accordance with the present invention.

Referring now to FIG. 3, a system for scheduling the power mode operation of a computer-based information handling system in accordance with the present invention is shown. The power mode scheduling system 300 comprises a processor 310 for controlling computer system 100 of FIG. 1. Computer based-information handling system 100 is capable of operating at a first power level for maximizing performance while receiving power from an external power source 328, and is capable of operating at a second power level for minimizing power consumption while receiving power from a battery 326. Additional plural power modes are further contemplated (e.g., three power modes wherein a first mode is a lower power mode, a second mode is an intermediate power mode, and a third mode is a higher power mode, etc.). Processor 310 may be a processor of central processing system 102 of computer-based information handling system 100. A regulator 324 provides an interface between battery 326, external power source 328 and processor 310 and the hardware of information handling system 100 for maintaining a precisely controlled, regulated supply voltage. Processor 310 typically includes on-board power management features allowing portable battery powered use of computer-based information handling system 100. BIOS system 312 interfaces with processor 310 to provide essential software routines that test the hardware of computer-based information handling system 100 at startup, start the operating system, and support the transfer of data among hardware devices. Typically, BIOS 312 is stored in read-only memory and interfaces with complementary metal-oxide silicon random-access memory (CMOS RAM) 314. CMOS RAM 314 provides a system configuration utility for computer-based information handling system 100, accessible at boot time, for setting up system options, such as date and time, types of drives installed, and port configuration. A scheduler 316 interfaces with BIOS 312 for maintaining a schedule of events to occur at predetermined times with respect to computer system 100. Scheduler 316 stores scheduling information in a schedule database 318. Operating system 330 executes on processor 310 and controls the allocation and usage of hardware resources such as memory, processor time, disk space, and peripheral devices. Scheduler 316 may be a program of instructions implemented by or in conjunction with, or integrated within, any one or more of BIOS 312, CMOS RAM 314 or operating system 330 and executed by processor 310.

A monitor 320 interfaces with scheduler 316 for determining whether an event scheduled by scheduler 316 requires computer-based information handling system 100 to receive power from battery 326. A power mode selector 322 interfaces with monitor 320 for selecting operation of computer-based information handling system 100 at one of several available power levels based upon the determination of monitor 320 whether operation from battery 326 is required. Power mode selector 322 sets the power level through BIOS 312. The number of available power levels at which information handling system 100 is capable of operating is determined by the power management routines provided by BIOS 312 and processor 310. Typically, there are at least two available power levels. A lower power level may be desired for operation from battery 326 in order to maximize battery charge. A higher power level may be desired for operation from an external power source 328 in order to maximize performance of computer-based information handling system 100. Any number of intermediate power levels between the lower and higher power levels may also be utilized.

Figure 4:
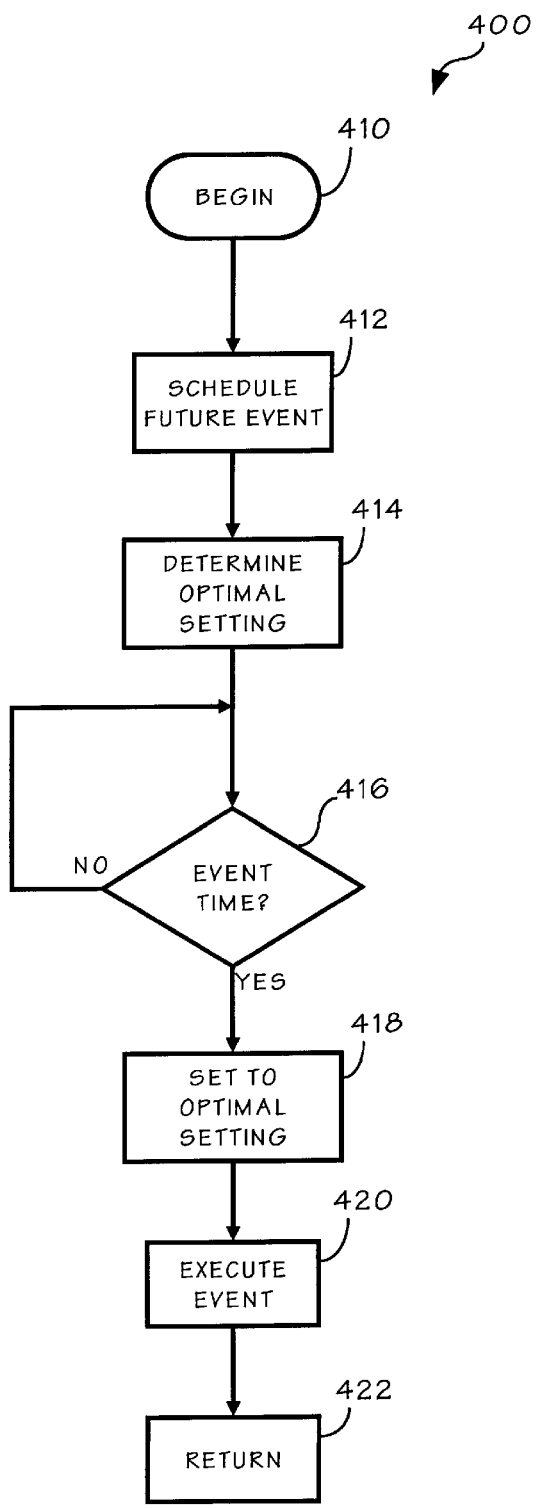
FIG. 4 is a flow diagram of an operational setting scheduling method in accordance with the present invention.

Referring now to FIG. 4, a flow diagram of an operational setting scheduling method in accordance with the present invention will be discussed. Upon initiation of method 400 at step 410, a future event is scheduled to occur at step 412. The future event may be any known or predetermined operation, function, or use of computer-based information handling system 100 of FIG. 1, or any known or predetermined operation, function or action of a user of computer-based information handling system 100, to occur at a predetermined time. For example, the user may schedule a presentation event to occur at a future time during which the user utilizes computer-based information handling system 100 during the presentation. The user may connect information handling system 100 to an overhead projector to display overhead slides electronically stored in a memory of information handling system 100. If the presentation were scheduled to occur at 10:00 a.m., at a predetermined time immediately prior to the presentation time (e.g., 9:59 a.m.) the appropriate operational settings of computer-based information handling system optimal for the presentation may be set. Upon scheduling of the event, a determination is made at step 414 what the optimal setting is for the computer-based information handling system during the scheduled event. For example, all suspend and standby functions of computer-based information handling system 100 may be disabled during the presentation. Further, video settings of display system 112 may be adjusted to a setting optimal for overhead projection, i.e. an appropriate video resolution may be set, the video output may be toggled to be displayed on an external display, and the video refresh rate may be adjusted, among other settings. Any additional types of operational setting of computer-based information handling system 100 may be optimally set as well. For example, any audible alarms may be disabled to prevent disturbance of the presentation, etc.

The scheduling, monitoring, selecting and setting of optimal operational settings for computer-based information handling system 100 may be controlled by a program of instructions executed by processor 310 and stored in BIOS 312 or CMOS RAM 314 for example. Alternatively, the program of instructions may be stored in an auxiliary memory 106 of computer-based information handling system 100 and may be an individual program or program code included as part of an operating system used for controlling and allocating usage of the hardware components of computer-based information handling system 100.

Basic input/output system (BIOS) 312 of computer-based information handling system 100 manages the monitoring of time and power level mode of computer-based information handling system 100. Typically, the BIOS firmware services (routines) are stored in auxiliary memory 106 in a ROM chip such as a flash ROM. The BIOS services continually monitor the present time in conjunction with CMOS RAM 314 of computer-based information handling system 100 and determine whether the present time is equal to the scheduled event time at step 416. CMOS RAM 314 may also exist as auxiliary memory 106, typically on a complementary metal-oxide silicon (CMOS) semiconductor device whose contents are maintained by a battery. CMOS RAM 314 maintains the date, time, and system parameter settings of computer-based information handling system 100. The BIOS service routines may include the real-time clock (RTC) service routines and the user timer service routines typically included with BIOS services. Upon reaching the scheduled event time, BIOS 312 sets computer-based information handling system to an optimal operational setting for the scheduled event at step 418. Computer-based information handling system 100 executes the scheduled event at the optimal operational setting at step 420. Upon completion of the scheduled event, computer-based information handling system 100 may return to a regular or default setting at step 422. Thus, in general, computer-based information handling system 100 may be set to operate at one of a plurality of available operational settings or modes for one or more operational characteristics, programs or devices of computer-based information handling system 100 at a predetermined scheduled time.

Although the invention has been described with a certain degree of particularity, it should be recognized that elements thereof may be altered by persons skilled in the art without departing from the spirit and scope of the invention. One of the embodiments of the invention can be implemented as sets of instructions resident in main memory 104 of one or more computer systems configured generally as described in FIG. 1. Until required by the computer system, the set of instructions may be stored in another computer readable memory such as 106 auxiliary memory of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the method and apparatus for operating an electronic device based upon a scheduled event of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for scheduling the power mode operation of a computer-based information handling system wherein the computer-based information handling system is capable of operating at a first power level for optimizing performance and is capable of operating at a second power level for optimizing power consumption, the method comprising:

scheduling an event to occur at a predetermined time;

determining whether the scheduled event requires the computer-based information handling system to receive power from a battery;

if the event is determined to require the computer-based information handling system to receive power from the battery, associating the second power level with the predetermined time; and at the predetermined time, operating the computer-based information handling system at the second power level.

2. A method as claimed in claim 1, further comprising the step of operating the computer-based information handling system at the first power level if the event is determined not to require the computer-based information handling system to receive power from the battery.

3. A method as claimed in claim 1, said determining step including the step of operating the computer-based information handling system at the first power level after completion of the event.

4. A method as claimed in claim 1, said scheduling step including the step of scheduling the event with a BIOS of the computer-based information handling system.

5. A method as claimed in claim 1, said scheduling step including the step of scheduling the event with a CMOS RAM of the computer-based information handling system.

6. A method as claimed in claim 1, said scheduling step including the step of scheduling the event with an operating system of the computer-based information handling system.

7. A computer readable medium whose contents cause a computer-based information handling system to execute steps for scheduling the power mode operation of the computer-based information handling system wherein the computer based-information handling system is capable of operating at a first power level for optimizing performance, and is capable of operating at a second power level for optimizing power consumption, the steps comprising:

scheduling an event to occur at a predetermined time;

determining whether the scheduled event requires the computer-based information handling system to receive power from a battery;

if the event is determined to require the computer-based information handling system to receive power from the battery, associating the second power level with the predetermined time; and at the predetermined time, operating the computer-based information handling system at the second power level.

8. A computer readable medium as claimed in claim 7, further comprising the step of operating the computer-based information handling system at the first power level if the event is determined not to require the computer-based information handling system to receive power from the battery.

9. A computer readable medium as claimed in claim 7, said determining step including the step of operating the computer-based information handling system at the first power level after completion of the event.

10. A computer readable medium as claimed in claim 7, said scheduling step including the step of scheduling the event with a BIOS of the computer-based information handling system.

11. A computer readable medium as claimed in claim 7, said scheduling step including the step of scheduling the event with a CMOS RAM of the computer-based information handling system.

12. A computer readable medium as claimed in claim 7, said scheduling step including the step of scheduling the event with an operating system of the computer-based information handling system.

13. A system for scheduling the power mode operation of a computer-based information handling system wherein the computer based-information handling system is capable of operating at a first power level for optimizing performance, and is capable of operating at a second power level for optimizing power consumption, comprising:

a scheduler for scheduling an event to occur at a predetermined time;

a monitor for determining whether an event scheduled by said scheduler requires the computer-based information handling system to receive power from a battery; and a power mode selector for selecting operation of the computer-based information handling system at one of the first or the second power levels based upon the determination of said monitor.

14. A system as claimed in claim 13, said power mode selector being adapted for selecting operation of the computer-based information handling system at the first power level in the event said monitor determines the event does not require the computer-based information handling system to receive power from the battery at the predetermined time.

15. A system as claimed in claim 13, said power mode selector being adapted for selecting operation of the computer-based information handling system at the second power level in the event said monitor determines the event requires the computer-based information handling system to receive power from the battery at the predetermined time.

16. A system as claimed in claim 13, said scheduler including a BIOS system of the computer-based information handling system.

17. A system as claimed in claim 13, said scheduler including a CMOS RAM system of the computer-based information handling system.

18. A system as claimed in claim 13, said scheduler including an operating system of the computer-based information handling system.

19. A system for scheduling the power mode operation of a computer-based information handling system wherein the computer based-information handling system is capable of operating at a first power level for optimizing performance, and is capable of operating at a second power level for optimizing power consumption, comprising:

means for scheduling an event to occur at a predetermined time;

means for determining whether an event scheduled by said scheduler requires the computer-based information handling system to receive power from a battery; and means for selecting operation of the computer-based information handling system at one of the first or the second power levels based upon the determination of said monitor.

20. A system as claimed in claim 19, said selecting means being adapted for selecting operation of the computer-based information handling system at the first power level in the event said determining means determines the event does not require the computer-based information handling system to receive power from the battery at the predetermined time.

21. A system as claimed in claim 19, said selecting means being adapted for selecting operation of the computer-based information handling system at the second power level in the event said determining means determines the event requires the computer-based information handling system to receive power from the battery at the predetermined time.

22. A system as claimed in claim 19, said scheduling means including a BIOS system of the computer-based information handling system.

23. A system as claimed in claim 19, said scheduling means including a CMOS RAM system of the computer-based information handling system.

24. A system as claimed in claim 19, said scheduling means including an operating system of the computer-based information handling system.

* * * * *